Patented Feb. 16, 1954

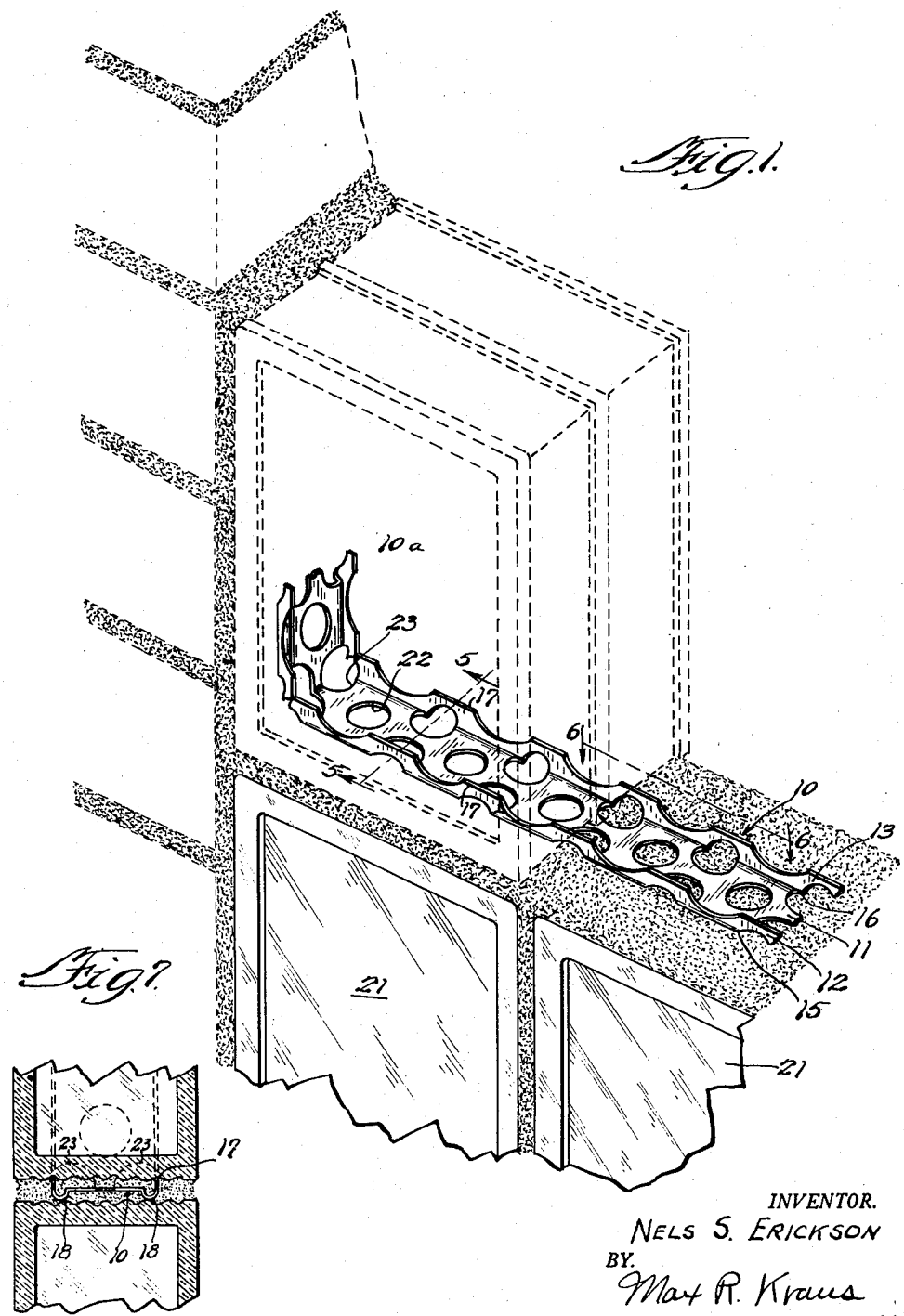

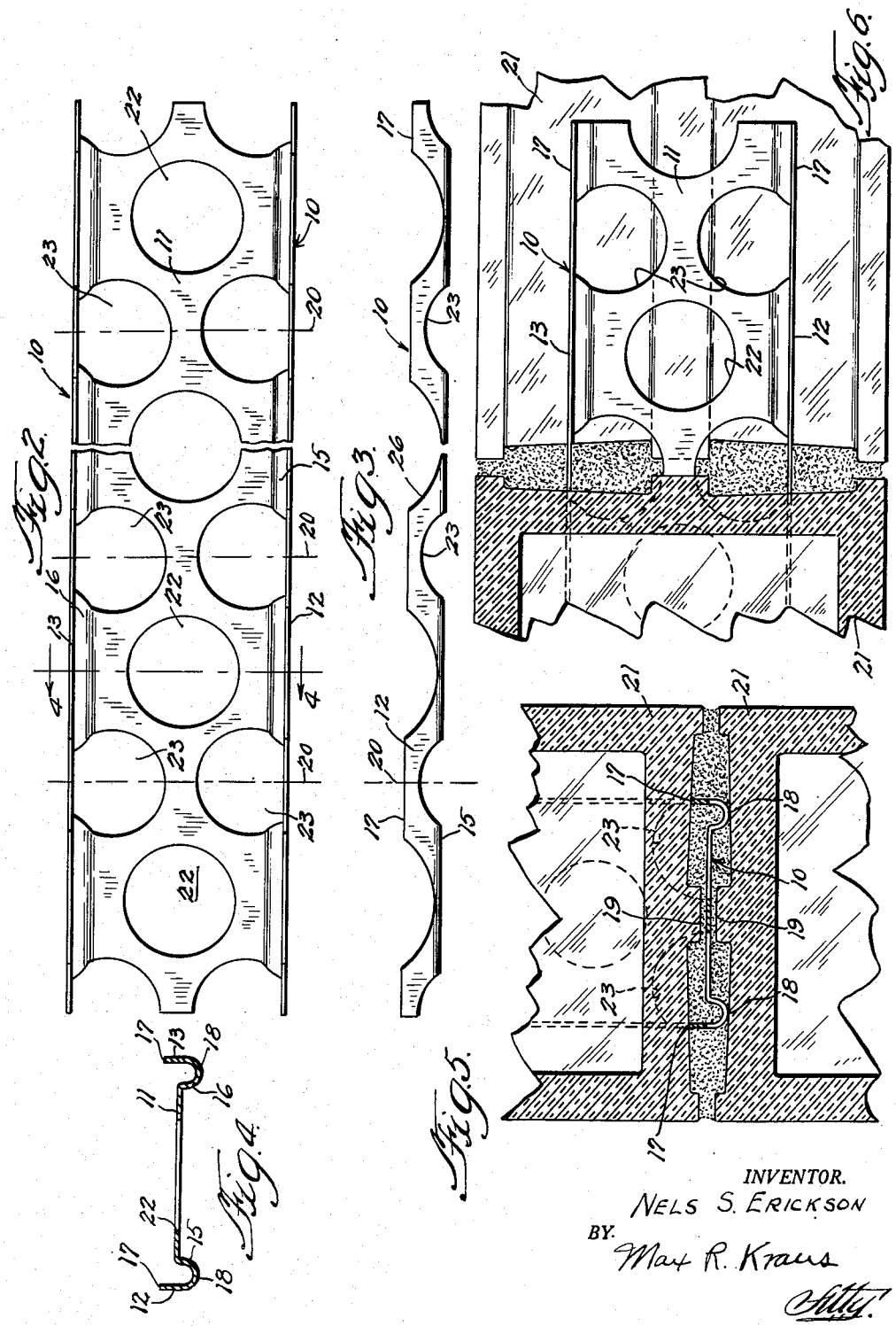

2,669,116

UNITED STATES PATENT OFFICE 2,669,116

BEARING AND SPACING GUIDE MEMBER FOR GLASS BLOCK PANEL CONSTRUCTION

Nels S. Erickson, Chicago, Ill., assignor to Glass Block Spacer Guide, Inc., Chicago, Ill., a corporation of Illinois Application June 9, 1950, Serial No. 167,175

1 Claim. (Cl. 72—107)

This invention relates to improvements in glass block wall construction and more particularly to spacer guides for insuring the proper positioning and spacing of glass blocks and proper alinement of the courses while the mortar joints are setting up, and for reinforcing the mortar joints.

It is known that difficulty is experienced in the construction of walls composed of glass blocks which are laid in mortar beds because the mortar joints do not set up rapidly in view of the lack of absorbency of the glass. In view of this fact, after a number of courses have been laid the weight of the blocks is sufficient to squeeze out the mortar in the lowest courses thereby reducing the proper thickness of mortar at those points and causing misalinement of the blocks.

Accordingly, it is an object of my invention to provide a bearing and spacing guide member for glass block masonry construction which will support the glass blocks in position and in alinement on bearing points until the mortar sets, thus enabling a mason to complete the laying of a large number of courses of glass blocks without the liability of the blocks becoming misalined and squeezing the mortar out from between the courses.

Another object of my invention is the provision of a member which will correctly gauge the thickness of the mortar joints and grip the mortar securely while at the same time permitting the mortar to flow freely between the glass blocks for a strong solid joint.

A further object of my invention is the provision of a member of the foregoing character which may be easily fabricated from sheet metal and which may be separated into convenient lengths without the use of tools of any kind.

A further object of my invention is the provision of a bearing member and spacing guide which is provided with planes of weakness which facilitate separation of the member into convenient lengths and which permit the member to be bent at any angle whereby the upstanding leg will provide a spacing guide for a vertical joint.

Other and further objects and advantages of my invention will become apparent from the following description when considered in connection with the accompanying drawings in which:

Fig. 1 is a perspective view of a glass block wall in the process of construction and embodying my invention.

Fig. 2 is a plan view of an embodiment of my invention.

Fig. 3 is a side elevational view thereof.

Fig. 4 is a cross-sectional view taken substantially on line 4—4 of Fig. 2.

Fig. 5 is a cross-sectional view taken substantially on line 5—5 of Fig. 1, and

Fig. 6 is a cross-sectional view on an enlarged scale taken substantially on line 6—6 of Fig. 1.

Fig. 7 is a view similar to Fig. 5 on a reduced scale and showing my invention used with another style of glass block.

Referring to the drawings, the bearing and spacing guide member of my invention is indicated generally by the numeral 10 and is preferably formed of sheet metal and includes a web 11 and a pair of spaced flanges 12 and 13, the said flanges being connected to the web portion 11 by substantially U-shaped or arcuately formed portions 15 and 16 which extend longitudinally of the member 10 in the form of beads or ribs and which serve to rigidify the member 10 and thereby permit the same to be made of lighter gauge sheet metal. As will be seen clearly by reference to Fig. 4, the web 11 is disposed substantially midway of the depth of the flanges 12 and 13 so that it is midway of the bearing points 17 and 18, thus providing clearance for accommodating the ribs 19 of the glass blocks 21, the web 11 being so spaced that it lies at a point medially between the glass blocks 21 when they are assembled in courses, as illustrated in Fig. 5.

The web 11 is provided with a plurality of spaced apertures 22 having their axes disposed along a longitudinal median line of the member 10. Intermediate each of two adjacent openings 22 are pairs of similar openings 23 arranged in spaced relation to each other. As will be seen clearly by reference to Figs. 2 and 3, the openings 23 extend into the flanges 12 and 13 thereby interrupting the continuity of the longitudinal ribs 15 and 16 and provide lines of weakness, such as 20, transversely of the member 10, such that the said member may be severed easily across the said lines or bent into any desired angle, as illustrated in Fig. 1. The flanges 12 and 13 are provided with spaced cutout sectors 26 which have their centers disposed substantially on a transverse line through the centers of the openings 22. It will be apparent that a large portion of the metal has been removed from the member 10 to provide openings of relatively large area so that the mortar may be allowed to flow freely between the glass blocks to produce a strong solid joint.

In the fabrication of the member 10 a strip of metal is first perforated to form the openings 22 and 23 and sector openings 26 and thereafter the ribs 15 and 16 and flanges 12 and 13 are formed in a suitable manner well known in the art.

The manner of use of my improved bearing and spacing guide member is illustrated clearly in Figs. 1, 5 and 6. The member 10 is rested on a supporting surface or on glass blocks 21 forming part of a lower course with the bearing points 18 engaging the top surfaces of the said glass blocks, as illustrated in Fig. 5, and with the flanges 12 and 13 directed upwardly so that the bearing points 17 thereof are in a position to engage the under surface of the glass blocks of the succeeding course. Thus, any error or guess work attending the installation of the glass blocks is entirely removed, since all of the blocks are uniformly spaced. Since the full weight of the block is carried on the bearing points of the member 10 and the block is properly supported thereon any liability of the block moving or shifting before the mortar has set is entirely eliminated. It is accordingly seen that a mason may install successive courses of glass blocks without waiting for the mortar of preceding course of blocks to become set, thus a particular job of any height or length may be completed without waiting for the mortar to set. According to old methods, only three or four courses of glass blocks could be installed successively before the mortar set, otherwise the weight of the glass blocks would cause the mortar to ooze out through the joints and would cause misalinement of the glass blocks. I have found by actual test that a building tradesman, with the use of my improved bearing and spacing guide members, can set up to 50% more glass blocks per day than by other methods heretofore used.

The bearing and guide member 10 may be conveniently separated into convenient lengths merely by bending the member across any line of weakness, such as 20 by grasping the member on both sides of the said line of weakness and bending the member back and forth several times to fracture the metal.

It is desirable at times to bend the member 10 into an L-shaped structure so that it may be used as a guide for vertical joints. This may be conveniently done by bending the member across a line of weakness and severing the flanges 12 and 13 but not the web portion 11. The vertically extending leg 10a of the L-shaped member thereafter may be easily fastened to a window jamb or other support for tie-in purposes.

While the bearing and the spacing guide member has been illustrated in connection with a glass block of a particular construction, it is to be understood that the said member is capable of being used with a variety of other types of glass blocks of conventional construction. Additionally, while the member 10 is illustrated as being disposed with the flanges 12 and 13 directed upwardly, it is to be understood that the member 10 may be reversed so that the said flanges are directed downwardly and the bearing points 17 thereof rest on a lower course of glass blocks.

It will be clear from the foregoing that I have provided an improved device for use in the construction of glass block masonry, the said device being easily fabricated from light sheet metal and facilitating the accurate construction of masonry walls, since it prevents misalinement of the bricks during construction and insures an effective and reinforced bond between succeeding courses of glass blocks. The spacing guide member may be conveniently separated by the user into any desired lengths along lines of weakness formed at regular intervals thereon and may easily and simply be adapted for a guide for vertical joint spacing in addition to use on horizontal joints.

I claim:

A flexible, metallic channel shaped bearing and spacing guide member adapted to be situated between adjacent courses of glass blocks in a glass block panel construction, said member comprising a pair of spaced, upwardly extending substantially parallel marginal flanges, the upper edges of said flanges constituting upper bearing surfaces adapted to bear against the bottom surface of an upper course of glass blocks, and a web portion between said spaced flanges, each of said flanges being connected to said web portion at the respective edges thereof by U-shaped portions extending downwardly from the plane of said web portion, the lower edges of said U-shaped portions constituting lower bearing surfaces adapted to rest upon the upper surface of a lower course of glass blocks, said web portion disposed substantially midway between the upper and lower bearing surfaces, said web portion having a first series of spaced openings disposed along the longitudinal center line of said web portion, said web portion having a series of pairs of openings therein, each opening of a pair being spaced apart transversely of the longitudinal center line of the web portion and each pair of openings being spaced apart along the longitudinal center line of said web portion, each pair of openings being positioned between adjacent openings of said first series, each opening of said series of pairs extending continuously from the web portion of said spacing guide member, through said U-shaped portion and into a respective flange, said pair of openings forming lines of weakness at spaced intervals along the member for dividing said member into convenient lengths or for bending said member into angular shape.

NELS S. ERICKSON.

References Cited in the file of this patent

UNITED STATES PATENTS

| Number | Name | Date |
|---|---|---|
| 1,560,354 | Smith | Nov. 3, 1925 |
| 2,123,003 | Eyring | July 5, 1938 |
| 2,140,999 | Hohl | Dec. 20, 1938 |
| 2,244,489 | Downes | June 3, 1941 |
| 2,483,560 | Peterson | Oct. 4, 1949 |